(12) United States Patent
Norta et al.

(10) Patent No.: US 7,266,378 B2
(45) Date of Patent: Sep. 4, 2007

(54) MOBILE LOCATION DEVICES AND METHODS

(75) Inventors: Heikki Norta, Espoo (FI); Peter Ashall, Wokingham (GB); Olli Oksanen, Helsinki (FI); Arto Lammintaus, Pirkkala (FI)

(73) Assignee: Nokia Corporation, Espoo (FI)

( * ) Notice: Subject to any disclaimer, the term of this patent is extended or adjusted under 35 U.S.C. 154(b) by 408 days.

(21) Appl. No.: 10/316,876

(22) Filed: Dec. 12, 2002

(65) Prior Publication Data

US 2003/0134657 A1    Jul. 17, 2003

(30) Foreign Application Priority Data

Dec. 14, 2001   (GB)   ................... 0129989.0

(51) Int. Cl.
*H04Q 7/20*   (2006.01)
(52) U.S. Cl. .................. 455/456.1; 455/550.1
(58) Field of Classification Search ........... 455/420, 455/421, 422.1, 456.1, 456.2, 456.6, 127.1, 455/90.3, 575, 574, 66.1, 550.1; 701/1, 2, 701/36, 209, 211; 707/100, 101, 201, 204; 342/357.1; 340/990, 395
See application file for complete search history.

(56) References Cited

U.S. PATENT DOCUMENTS

| | | | |
|---|---|---|---|
| 6,049,718 A * | 4/2000 | Stewart | 455/456.4 |
| 6,067,044 A | 5/2000 | Whelan et al. | 342/357.07 |
| 6,141,609 A * | 10/2000 | Herdeg et al. | 701/35 |
| 6,420,975 B1 * | 7/2002 | DeLine et al. | 340/815.4 |
| 6,526,335 B1 * | 2/2003 | Treyz et al. | 701/1 |
| 2002/0049742 A1 * | 4/2002 | Chan et al. | 707/1 |
| 2003/0050038 A1 * | 3/2003 | Haave et al. | 455/404 |

FOREIGN PATENT DOCUMENTS

| | | |
|---|---|---|
| EP | 0748080 | 12/1996 |
| GB | 2270405 | 3/1994 |
| GB | 2318940 | 5/1998 |
| WO | 9324911 | 12/1993 |
| WO | 9529410 | 11/1995 |

* cited by examiner

*Primary Examiner*—Jean Gelin
(74) *Attorney, Agent, or Firm*—Alston & Bird LLP

(57) ABSTRACT

A mobile location device comprising geographical location circuitry to provide device geographical location information and motion detection circuitry to detect motion of the device, wherein the geographical location circuitry is arranged to provide device geographical location information according to whether motion of the mobile location device is detected by the motion detecting circuitry.

21 Claims, 1 Drawing Sheet

MOBILE LOCATION DEVICES AND METHODS

BACKGROUND OF THE INVENTION

The invention relates to mobile location devices, which make advantageous use of wireless transmission methods to provide device location information. Such location information may be the current geographical location of the device, and/or location dependent information. The mobile location devices may be dedicated location devices, but may alternatively provide other functionality, such as the ability to make telephone calls or provide user diary services, for example, as that provided by a Personal Digital Assistant (PDA).

The term mobile is used in the sense that it describes a device, which is not fixed in any one geographical location but moves location over time. Such devices may be portable and/or may be temporarily or permanently attached to any moveable object, such as a vehicle, person or animal. With such devices being moveable, and thus not always located near an external power supply, these devices often incorporate a built-in power supply, which would require periodic recharging and/or replacement. Nevertheless, in certain cases, a mobile location device may be temporarily or permanently driven by an external power supply, such as mains power or a vehicle battery in the case of a mobile location device permanently fixed to a vehicle and arranged to obtain power from the vehicle battery. All such forms of devices are within the scope of the present invention.

SUMMARY OF THE INVENTION

In a first aspect, the present invention provides a mobile location device comprising geographical location means to provide device geographical location information and motion detection means to detect motion of the device, wherein the geographical location means is arranged to provide device geographical location information according to whether motion of the mobile location device is detected by the motion detecting means.

As the provision of geographical location information consumes power, associating the provision of location information according to whether motion of the device is detected reduces power consumption. The invention advantageously updates location information based on movement, when changes in location are likely to be the greatest, and when the device is likely to be in use. Thus, the present invention avoids location information updates when there is little or no movement i.e. location information updates are rationed.

The motion detection means may comprise one or more motion sensors configured to detect changes in tilt/yaw/horizontal/vertical/rotational position individually, in multiples or in combination.

The motion detection means may comprise means to detect changes in device geographical location. This may be by having comparison means to compare a previous geographical location with the current geographical location to determine whether changes in geographical location have occurred. Changes of geographical location may be horizontal, vertical or a combination thereof.

The motion detection means may be configured to detect any changes in motion, or may be configured to detect changes in motion above a threshold level. Embodiments detecting threshold level of changes will further reduce power consumption by associating the provision of geographical location information, and thus power consumption, with major, and not minor, changes.

The device may be configured to provide device geographical location information immediately upon the detection of device motion.

Preferably, the device comprises control means arranged to monitor device motion detected by the motion detection means over successive time periods and control the operation of the geographical location means in response to whether device motion has been detected over one, or a combination of more than one, successive time period. The same, or different, time period(s) may be used.

Preferably, the control means is configured to control the operation of the geographical location means to provide device geographical location information at the end of one or more of the time periods. Thus, rather than provide location information immediately on the detection of motion, this embodiment of the present invention monitors motion over a period of time, and at the end of the time period provides geographical location information. Accordingly, the provision of geographical location information is delayed to the end of the time period, resulting in fewer times when location information is provided, and thus an overall reduction in power consumption.

The control means may be configured to use a first time period when device motion has been detected and a second time period when device motion is not detected. Thus, it would be possible to, for example, provide device geographical location information at 15-minute intervals whenever the device is in motion, and at 1-week intervals when the device is not moving. Such an embodiment may be modified to provide device location information immediately upon detection of device motion and then again at one regular time interval during the detection of continued motion, and at a reduced time interval upon subsequent detection of no motion.

In a preferred embodiment, the control means may be configured to operate the geographical location means at regular intervals regardless of whether device motion has been detected. Preferably, the control means is configured to operate the geographical location means at regular intervals upon detection of no motion by the motion detection means over a particular time period.

Thus, geographical location information is provided even if the device has been motionless for a period of, for example, 1-week. In such a case, the control means may be further configured to provide information on the operative state of the device e.g. whether it is still working or device battery life status. This operative state information may be sent in the form of a Short Message Service (SMS) message, which may be sent back to the device to notify the user or to a third party terminal. The mobile location device may be configured to provide operative state information at regular intervals, regardless of whether device motion has been detected.

Preferably, the mobile location device comprises programming means to allow the control means time periods to be set, for example, by a user of the device. The programming means may be a keypad on the device. However, the programming may be done via an external accessory such as a keyboard, or via any other terminal equipment that can access the device. Such terminals can be, for example, mobile phones or PCs. The device may be configured such that programming commands may be given by using software that is specific to the operating system of the device, or by using SMS messages.

The mobile location device may be arranged such that the association between the means to provide device geographical location information and the motion detection means can be activated and/or deactivated. Thus, it will be possible to switch on/off the link between the provision of location information and motion. This may be by operation of actuation means, preferably located on the mobile location device. In a preferred embodiment, the control means is arranged to activate/deactivate the geographical location means according to whether motion of the device has been detected. This would, of course, be activation of the means to provide device geographical location information upon detection of motion, and deactivation upon detection of no motion, or motion below a particular threshold level.

In a preferred embodiment, the control means is arranged to control the operation of the geographical location means to obtain current device geographical information upon detection of device motion by the motion detecting means. Thus, up-to-date location information will be provided when the device is in motion. Preferably, the control means is configured to control the operation of the geographical location means to obtain current geographical location information at a reduced frequency when device motion is not detected by the motion detecting means.

Mobile location devices may comprise wireless transmission means to obtain the current geographical location information of the device. In one embodiment, the geographical location means comprises wireless transmission means and wherein the device is arranged such that the operation of the wireless transmission means to obtain the current geographical location information is based on detection of motion by the motion detection means. Obtaining the current geographical location of the device consumes power, and by further associating the obtaining of the current geographical location information with motion of the device, this embodiment of the present invention reduces power consumption. Furthermore, this association of the operation of the wireless transmission means would free up valuable bandwidth with wireless transmissions being rationed. Again, any motion, or motion above a threshold level, may be used to trigger the operation of the wireless transmission means to obtain the geographical location information.

The provision of geographical location information may be to a user of the device. In such a case, the geographical location means may comprise user display means to display geographical location information to a user of the device. The geographical location means may comprise sound means to provide geographical location information to a user of the device. The geographical location means may comprise both user display and sound means.

The provision of device geographical location information may be to a third party. In such a case, the geographical location means would be arranged to provide the geographical location information to a third party terminal. This would preferably be done by wireless transmission means incorporated into the mobile location device. Advantageously, this embodiment would free up bandwidth by having wireless third party transmissions between the mobile location device and the third party terminal associated with motion of the mobile location device. This embodiment would also reduce overall power consumption, not only of the mobile location device but also of the third party terminal. The mobile location device may be arranged such that the same wireless transmission means obtains the current geographical location information and provides the current geographical location information to a third party terminal, or at least that both the wireless transmission means share some common components.

The geographical location means may be arranged to provide geographical location information to a third party terminal by transmissions directly between a third party terminal and the mobile location device, or indirectly via a communications network. The third party terminal may be another mobile location device or may be an access point device of a wireless local area network (WLAN), a cellular basestation, or other network device.

The geographical location means may be arranged to provide device geographical location information to a third party terminal and/or to the user of the mobile location device. Alternatively, the geographical location means may be arranged to solely provide geographical location information to a third party terminal/device. So, for example, in the case of the provision of information solely to a third party terminal, the mobile location device would not necessarily require a user display means. Such a device would have particular security applications in, for example, tracking the movement of ex-convicts on parole. Furthermore, if such a mobile location device was attached to a precious article, the geographical location of the device, and thus the precious article, could be monitored from a remote terminal, preferably a mobile terminal such as a cellular telephone. This may be conveniently done using Internet transmission paths.

In a further embodiment, the device may be configured to receive location dependent information content from a third party terminal to which device geographical location information has been provided by the geographical location means. Such a mobile location device would preferably comprise wireless transmission means arranged to receive the location dependent information and sound and/or display means to provide this location dependent information to the user. Examples of such location dependent information may be directions/distance to a particular place from the present location, and/or retail offers from retail outlets in the vicinity of the present location i.e. so called "value added services".

Satellite (e.g. Global Position System (GPS), Assisted Global Positioning System (A-GPS)) or cellular based (e.g. Cell-ID, Enhanced Observed Time Difference (E-OTD), RTT/IP-DL) location technologies can be the means to provide device geographical location information, and in appropriate embodiment, location dependent information content. Bluetooth™ technology may also be used to provide such information. The mobile location devices according to the present invention may use any of these technologies singly or in combination, and any future developments in location technology. However, cellular and Bluetooth™ based technologies have the distinct advantage over GPS technology in that they also provide an uplink channel which can be used to send the device geographical location information to other remote terminals/sources.

Preferred embodiments of the present invention will use technology which provides one or more uplink transmission channels. In a preferred embodiment, the mobile location device is a cellular device, and the geographical location means provides device geographical information by connecting to cellular network device.

The mobile location device may be configured to itself comprise the location technology. However, the device may be configured to obtain geographical location information by accessing location technology incorporated in a neighbouring terminal or device. For example, as well as location determination from pre-programmed beacons or access point devices, a mobile location device according to the present invention, such as a PDA, could access the GPS technology in a neighbouring phone or vehicle to obtain the approximate geographical location information of the device. Thus, the mobile location devices of the present invention have at least the ability to obtain device geographical location information, if not from specific location technology incorporated within the device then by using location technology located in neighbouring terminals or devices.

In the particular case of mobile location devices with a portable in-built power supply, such as a battery, the reduced power consumption increases battery life and accordingly increases device-operating life. The reduced power consumption also reduces the requirement to recharge or replace the battery, and thus the frequency of battery rechargements/replacements is reduced.

In certain cases, the mobile location device may comprise a rechargeable power supply. Such power supplies are known to only be rechargeable a finite number of times before they become ineffective. Accordingly, by reducing the recharging frequency, the present invention increases the overall operating life of such rechargeable power supplies.

In a second aspect, the present invention provides a method of operating a mobile location device comprising detecting device motion by using device motion detection means, and using device geographical location means to provide device geographical location information in response to detection of motion of the mobile location device by the motion detecting means.

Methods of operating a mobile location device having one or more, or combinations thereof, of the preferred features according to the first aspect of the invention, mutatis mutandis, can equally be applied to the second aspect of the invention and are also within the scope of the present invention.

In a third aspect, the present invention provides a method of operating a mobile location device comprising obtaining, using device wireless transmission means, device geographical location information according to detection of device motion.

Methods of operating a mobile location device having one or more, or combinations thereof, of the preferred features according to the first aspect of the invention, mutatis mutandis, can be equally applied to the third aspect of the invention and are also within the scope of the present invention.

In a fourth aspect, the present invention provides a method of providing location-based information content to a mobile location device by providing device geographical location information according to detection of motion of the device.

Methods of providing location based information content to a mobile location device having one or more, or combinations thereof, of the preferred features according to the first aspect of the invention, mutatis mutandis, can be equally applied to the fourth aspect of the invention and are also within the scope of the present invention.

BRIEF DESCRIPTION OF THE DRAWINGS

Specific embodiments of the invention will now be described with reference to the following Figures in which.

DETAILED DESCRIPTION OF INVENTION

Figure 1:
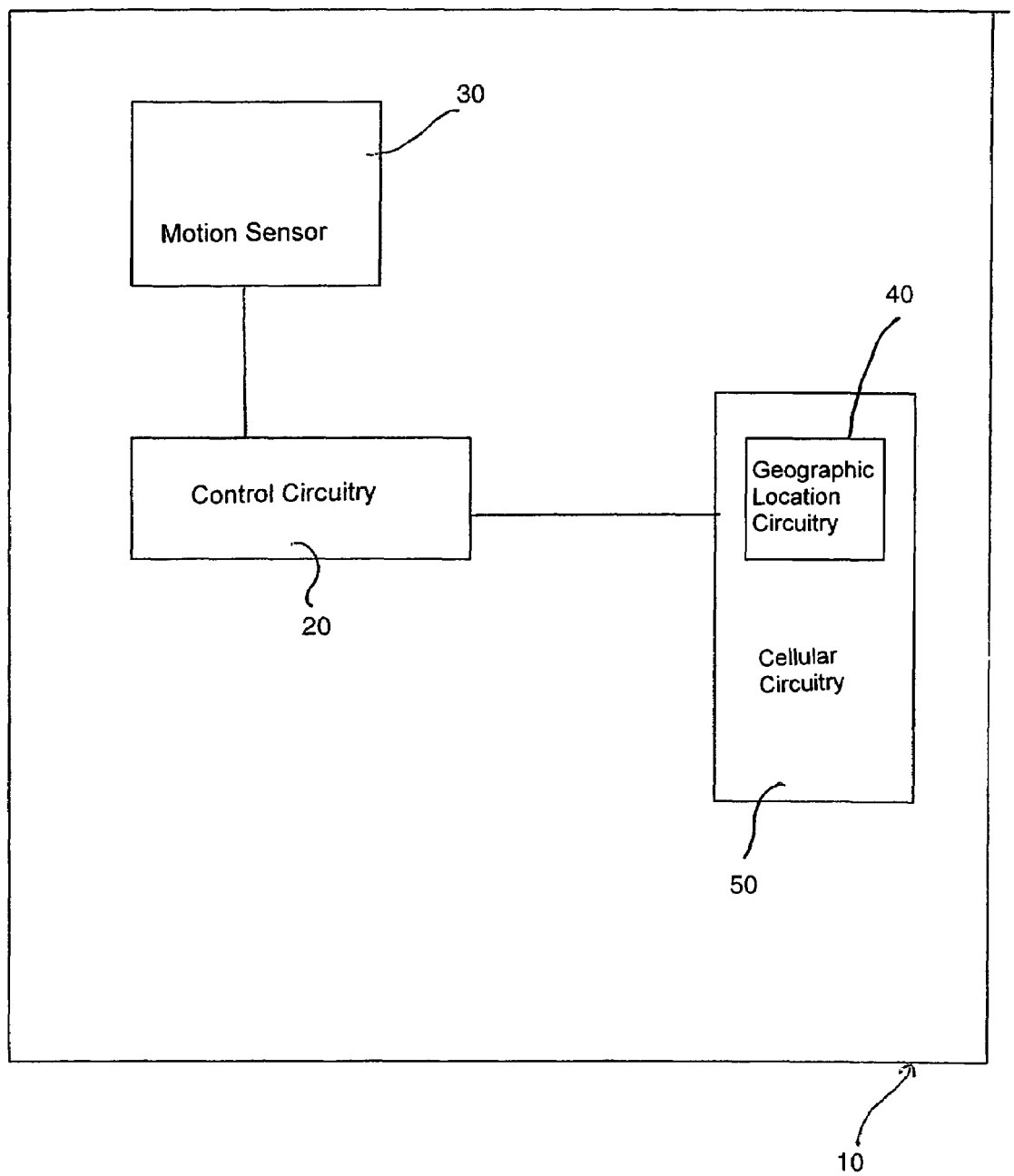
FIG. 1 is a schematic illustration of one embodiment of a mobile location device according to the present invention.

Take the specific case of a mobile location device in the form of a location tag 10. The tag 10 is a device meant to be attached to any movable object and to give information of its geographical location. The location tag 10 is a cellular device, whose purpose is to be located through an applicable cellular location-based technology. This location tag 10 is meant to be used e.g. for vehicles, boats, pets, or even large, movable belongings where the location tag 10 can preferably be hidden. In one preferred embodiment, the owner of a vehicle, for example, can oversee the whereabouts of his/her vehicle using a mobile communications device, such as a cellular telephone. The location can be conveniently tracked by viewing a geographical map displayed on, for example a Nokia Communicator™ or a Personal Computer, upon which is displayed the current location of the tag 10.

The location tag 10 is shown schematically in FIG. 1. It comprises control circuitry 20 arranged to receive tag motion information detected by the motion sensor 30. The control circuitry 20 is also arranged to control the operation of the geographical location circuitry 40, this circuitry providing the geographical location of the tag 10. Conveniently, the geographical location circuitry 40 may be part of the cellular circuitry 50, via which transmission between the tag 10 and the cellular network takes place.

The control circuitry 20 is configured to monitor the tag motion information provided by the motion sensor 30. Upon detection of tag motion, the control circuitry 20 is configured to activate the geographical location circuitry 40. The control circuitry 20 is arranged to keep the geographical location circuitry 40 activated during continued motion and deactivated during periods of rest. Furthermore, regardless of the tag motion information provided by the motion sensor 30, the control circuitry 20 is arranged to activate the geographical location circuitry 40 at defined intervals. The control circuitry 20 is also programmable so that the periods of activation of the geographical location circuitry 40 can be changed. So, for example, rather than activating the geographical location circuitry 40 continuously during tag motion, the control circuitry 20 can be programmed to activate the geographical location circuitry 40 at 15-minute intervals.

When using GPS technology, the geographical location circuitry 40 obtains the particular location information of the tag 10 from a satellite, and uses the cellular circuitry to send this information to a cellular network device, via an uplink transmission channel. The cellular network device then accesses geographical location based information content associated with the particular location of the tag 10. This information is stored in a network database. The associated geographical location based information content is then transmitted to the location tag 10. Advantageously, the network device may check user preferences stored on the network device to aid in the selection of user relevant location based information content, prior to this information being sent to the location tag 10.

However, in the case of the tag 10 only using cellular technology, activation of the geographical location circuitry 40 would enable it to communicate with the cellular network devices and allow the network to identify the location of the tag 10 using triangulation of the tag 10 via network basestations. Location based information content may be provided as before. The geographical location circuitry 40 may also, or separate to processing carried out by the network to determine geographical location of the tag 10, process data provided via the network to determine the geographical location of the tag 10.

The invention claimed is:

1. A user portable, mobile location device comprising geographical location circuitry to provide device geographical location information, power supply circuitry to supply power to the geographical location circuitry, motion detection circuitry to detect motion of the user portable device and control circuitry to control activation/deactivation of the geographical location circuitry, wherein the activation of the geographical location circuitry increases the power supplied by the power supply circuitry to the geographical location circuitry, wherein the control circuitry is arranged to control the activation/deactivation of the geographical location circuitry to provide device geographical location information according to whether motion of the mobile location device is detected by the motion detection circuitry, and wherein the control circuitry is arranged to monitor device motion detected by the motion detection circuitry over successive time periods and control the operation of the geographical location circuitry in response to whether device motion has been detected over one, or a combination of more than one successive, time period.

2. A mobile location device according to claim 1, wherein the motion detection circuitry comprises one or more motion sensors configured to detect changes in tilt/yaw/horizontal/vertical/rotational position individually, in multiples, or in combination.

3. A mobile location device according to claim 1, wherein the motion detection circuitry comprises circuitry to detect changes in device geographical location.

4. A mobile location device according to claim 3, wherein the circuitry is a comparison circuitry arranged to compare a previous geographical location with the current geographical location to determine whether changes in geographical location have occurred.

5. A mobile location device according to claim 4, wherein the changes of geographical location detected are horizontal, vertical or a combination thereof.

6. A mobile location device according to claim 1, wherein the motion detection circuitry is configured to detect changes in motion above a threshold level.

7. A mobile location device according to claim 1, wherein the control circuitry is arranged to control operation of the geographical location circuitry to provide device geographical location information at the end of one or more of the time periods.

8. A mobile location device according to claim 1, wherein the control circuitry is configured to use a first time period when device motion has been detected and a second time period when device motion is not detected.

9. A mobile location device according to claim 8, wherein the device is arranged to provide device location information immediately upon detection of device motion and then again at one regular time interval during the detection of continued motion, and at a reduced time interval upon subsequent detection of no motion.

10. A mobile location device according to claim 1, wherein the control circuitry is configured to operate the geographical location circuitry at regular intervals regardless of whether device motion has been detected.

11. A mobile location device according to claim 1, wherein the control circuitry is configured to operate the geographical location circuitry at regular intervals upon detection of no motion by the motion detection circuitry over a particular time period.

12. A mobile location device according to claim 11, wherein the control circuitry is configured to provide information on the operative state of the device.

13. A mobile location device according to claim 12, wherein the operative state information is transmitted at regular intervals, regardless of whether device motion has been detected.

14. A mobile location device according to claim 1, wherein the mobile location device is arranged such that the control circuitry has an activated state and a deactivated state.

15. A mobile location device according to claim 1, wherein the control circuitry is arranged to control the operation of the geographical location circuitry to obtain current device geographical information upon detection of device motion by the motion detection circuitry.

16. A mobile location device according to claim 1, wherein the control circuitry is configured to control the operation of the geographical location circuitry to obtain current geographical location information at a reduced frequency when device motion is not detected by the motion detection circuitry.

17. A mobile location device according to claim 1, wherein the geographical location circuitry comprises wireless transmission circuitry and wherein the device is arranged such that the operation of the wireless transmission circuitry to obtain the current geographical location information is based on detection of motion by the motion detection circuitry.

18. A mobile location device according to claim 1, wherein the device is configured to receive location dependent information content from a third party terminal to which device geographical location information has been provided by the geographical location circuitry.

19. A mobile location device according to claim 1, wherein the geographical location circuitry is arranged to obtain geographical location information by accessing location technology incorporated in a neighboring terminal or device.

20. A method of operating a user portable, mobile location device comprising detecting device motion by using device motion detection circuitry, and activating/deactivating device geographical location circuitry to provide device geographical location information in response to detection of motion of the mobile location device by the motion detection circuitry, monitoring device motion detected by the device motion detection circuitry over successive time periods, and controlling the operation of the geographical location circuitry in response to whether device motion has been detected over one, or a combination of more than one successive, time period.

21. The method of claim 20, further comprising using a first time period when device motion has been detected and a second time period when device motion is not detected.

* * * * *